(12) United States Patent
Chang et al.

(10) Patent No.: US 7,394,455 B2
(45) Date of Patent: Jul. 1, 2008

(54) ELECTRONIC DEVICE

(75) Inventors: Jackson Chang, Taipei (TW); Chin-Fa Lee, Taipei (TW); Chi-Yu Ho, Taipei County (TW)

(73) Assignee: Inventec Appliances Corporation, Taipei Hsieng (TW)

( * ) Notice: Subject to any disclaimer, the term of this patent is extended or adjusted under 35 U.S.C. 154(b) by 593 days.

(21) Appl. No.: 10/644,993

(22) Filed: Aug. 21, 2003

(65) Prior Publication Data

US 2005/0041382 A1   Feb. 24, 2005

(51) Int. Cl.
*G09G 5/00* (2006.01)

(52) U.S. Cl. ............... 345/168; 345/173; 345/184

(58) Field of Classification Search ............ 345/156, 345/168, 169, 173, 184
See application file for complete search history.

(56) References Cited

U.S. PATENT DOCUMENTS

| | | | | |
|---|---|---|---|---|
| 5,262,763 A * | 11/1993 | Okuyama et al. | ............. | 345/87 |
| 5,584,054 A * | 12/1996 | Tyneski et al. | ............. | 455/566 |
| 5,742,894 A * | 4/1998 | Jambhekar et al. | ....... | 455/575.3 |
| 5,995,025 A * | 11/1999 | Sternglass et al. | ............. | 341/22 |
| 6,215,474 B1 * | 4/2001 | Shah | ............. | 345/168 |
| 6,424,844 B1 * | 7/2002 | Lundqvist | ............. | 455/566 |
| 6,611,693 B2 * | 8/2003 | Soini et al. | ............. | 455/556.1 |
| 6,628,267 B2 * | 9/2003 | Karidis et al. | ............. | 345/168 |
| 6,700,773 B1 * | 3/2004 | Adriaansen et al. | ......... | 361/680 |
| 6,782,281 B1 * | 8/2004 | Nagasawa | ............. | 455/575.3 |
| 6,924,788 B2 * | 8/2005 | Hsu et al. | ............. | 345/168 |
| 7,023,421 B2 * | 4/2006 | Wong et al. | ............. | 345/156 |
| 7,142,270 B2 * | 11/2006 | Yamauchi et al. | ............. | 349/113 |
| 2003/0078069 A1 * | 4/2003 | Lindeman | ............. | 455/550 |
| 2004/0012920 A1 * | 1/2004 | Tanimoto et al. | ............. | 361/683 |
| 2004/0075971 A1 * | 4/2004 | Tseng et al. | ............. | 361/681 |

* cited by examiner

*Primary Examiner*—Richard Hjerpe
*Assistant Examiner*—Tom V Sheng
(74) *Attorney, Agent, or Firm*—Birch, Stewart, Kolasch & Birch, LLP

(57) ABSTRACT

A display unit which is electronically connected to a body to display data, and has an antenna electronically connected thereto for transferring data. The body has a first element, a second element, an index unit and an intermediate element. The second element is coupled to the first element along a first axis, and the index unit is coupled to the second element along a second axis through the intermediate element and electronically connected to the display unit. The index unit is electronically connected to the display unit and provides a first index port and a second index port, allowing different function modes, respectively.

26 Claims, 7 Drawing Sheets

ELECTRONIC DEVICE

BACKGROUND OF THE INVENTION

1. Field of the Invention

The present invention relates to an electronic device, and in particular to an electronic device provided with an index unit having two different index ports to switch between two different modes with degree of freedom larger than two.

2. Description of the Related Art

Electronic apparatus or devices, such as mobile phone, Person Digital Assistant (PDA), etc., are provided with an internal keyboard for data input. In, for example, a mobile phone, the internal keyboard is permanently fixed TO the main part of the mobile phone, and the keyboard must be reduced in size commensurately with the demands on these electronic products for smaller volume. Only a few basic keys are thus provided on the internal keyboard of the mobile phone.

However, when some characters and fonts, not initially provided on the internal keyboard or preset in the mobile phone, are to be input, an external keyboard, touch displayer (LCD), or the like is needed.

SUMMARY OF THE INVENTION

Accordingly, an object of the invention is to provide an electronic device with an index unit having two different index ports to switch between two different modes.

The invention provides an electronic device, such as a mobile phone, having a body, a display unit, and an antenna. The display unit is electronically connected to the body to display data, and the antenna is electronically connected to the body for transferring data. The body has an index unit provided with first and second index ports, from which data can be input. Thus, the mobile phone can function in different modes when switching from the first index port of the index unit to the second index port of the index unit.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
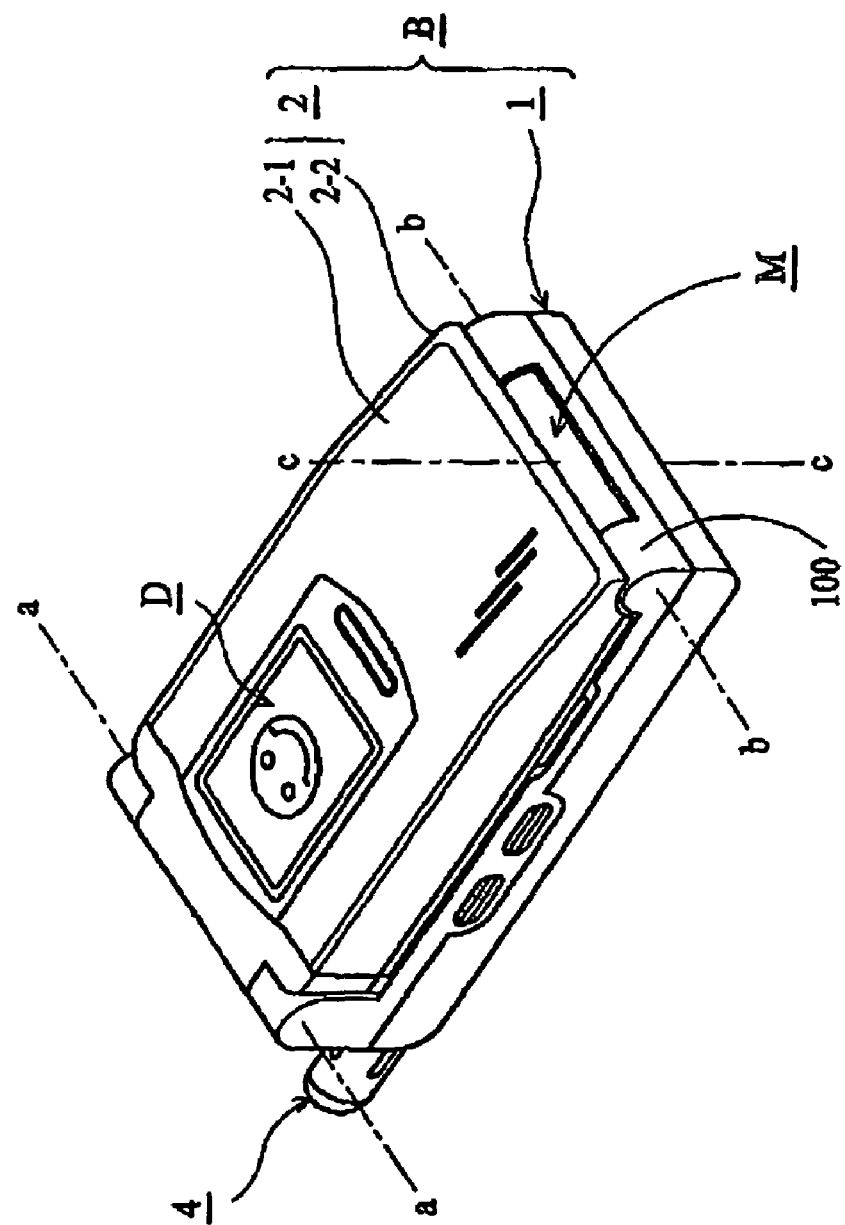
FIG. 1 is a perspective view of an electronic device (E) of the invention, in a closed position.

In FIG. 1, an electronic device E of the invention has a body B comprising a pivotal seat 100, a display unit D and an antenna 4. The body B is a host of the electronic device E. The display unit D is electronically connected to the body B to display image data B, and the antenna 4 is electronically connected to the body B for transferring data. In this preferred embodiment, the display unit D is a liquid crystal display (LCD).

Figure 2:
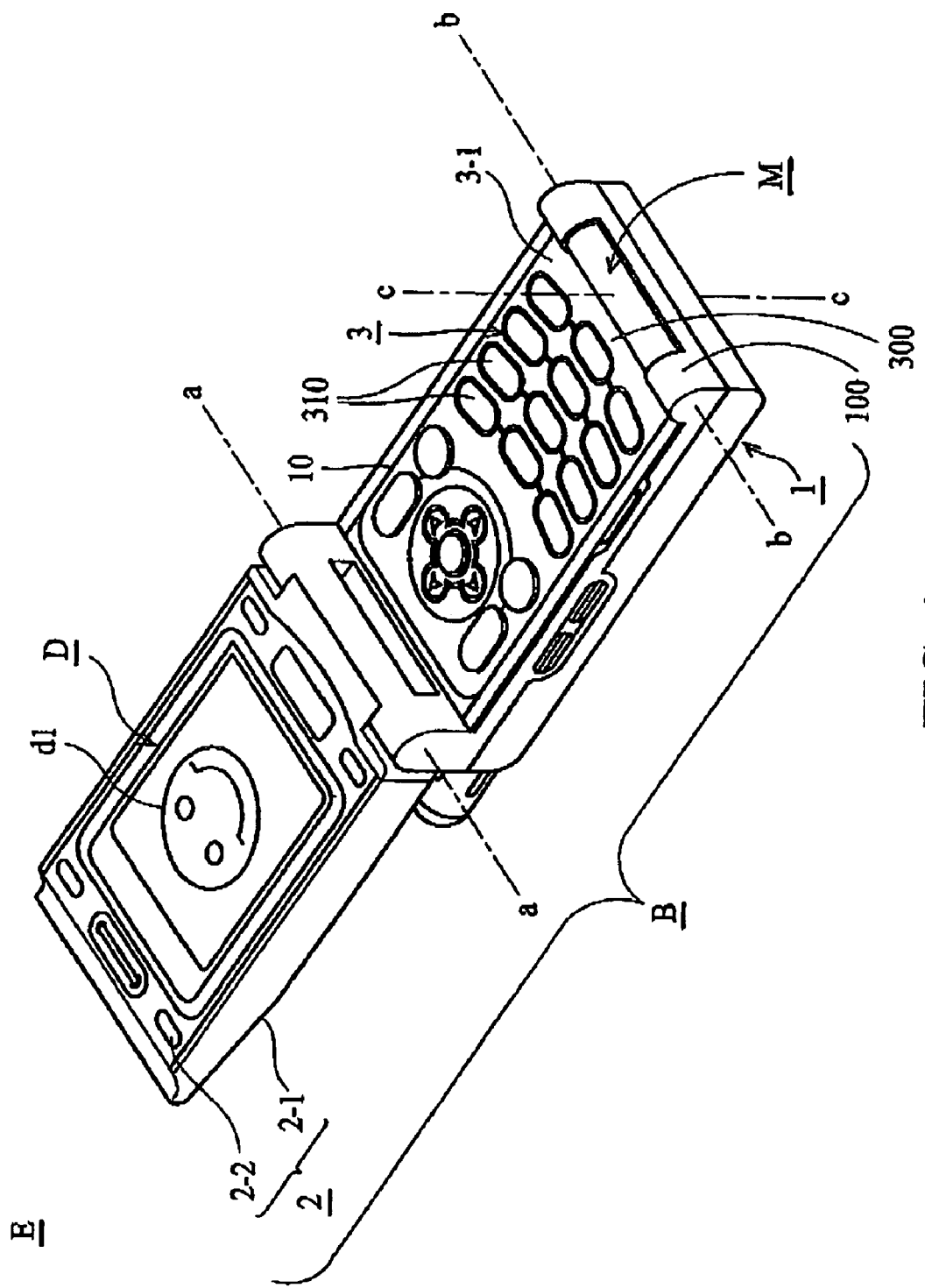
FIG. 2 is another perspective view of the electronic device (E) in FIG. 1, in an open position, provided with an index unit (3) in a first mode.

In FIG. 2, the body B has a first element 1, a second element 2, an index unit 3 comprising a connecting end 300 coupled to the pivotal seat 100 of the body B, and an intermediate element M. The second element 2 is coupled to the first element 1 along a first axis a-a. The index unit 3 is coupled to the second element 2 along a second axis b-b through the intermediate element M and electronically connected to the display unit D. The index unit 3 has a first index port 3-1 electronically connected to the display unit D through a circuit not shown. In FIG. 2, the index unit 3 is received in a main seat 10 of the first element 1 and in a first mode by exposure on the outside of the first element 1, such that the display unit D can be controlled by the first index port 3-1. The first index port 3-1 is composed of several keys 310.

The second element 2 of the body B has a first panel 2-1 and a second panel 2-2. The display unit D disposed on the first panel 2-1 and the second panel 2-2 is electrically connected to the first element 1. Thus, data can be viewed on the display unit D either from the first panel 2-1 or from the second panel 2-2 of the second element 2. That is to say, data can be viewed no matter whether the electronic device E is closed (FIG. 1) or open (FIG. 2).

Figure 3A:
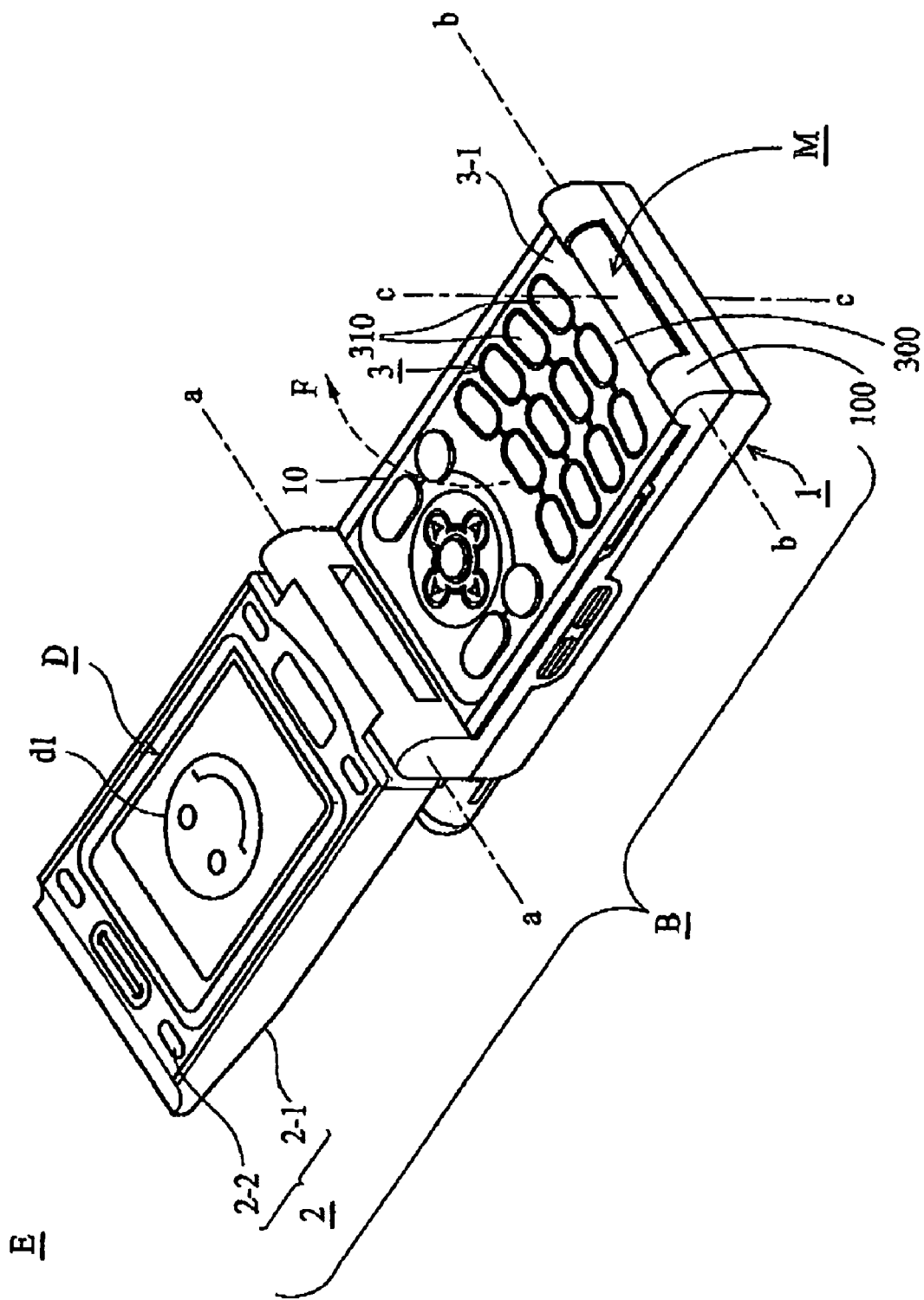
FIG. 3A is a perspective view of the electronic device (E), wherein a force (F) is applied to open the index unit (3) of the electronic device (E)
Figure 3B:
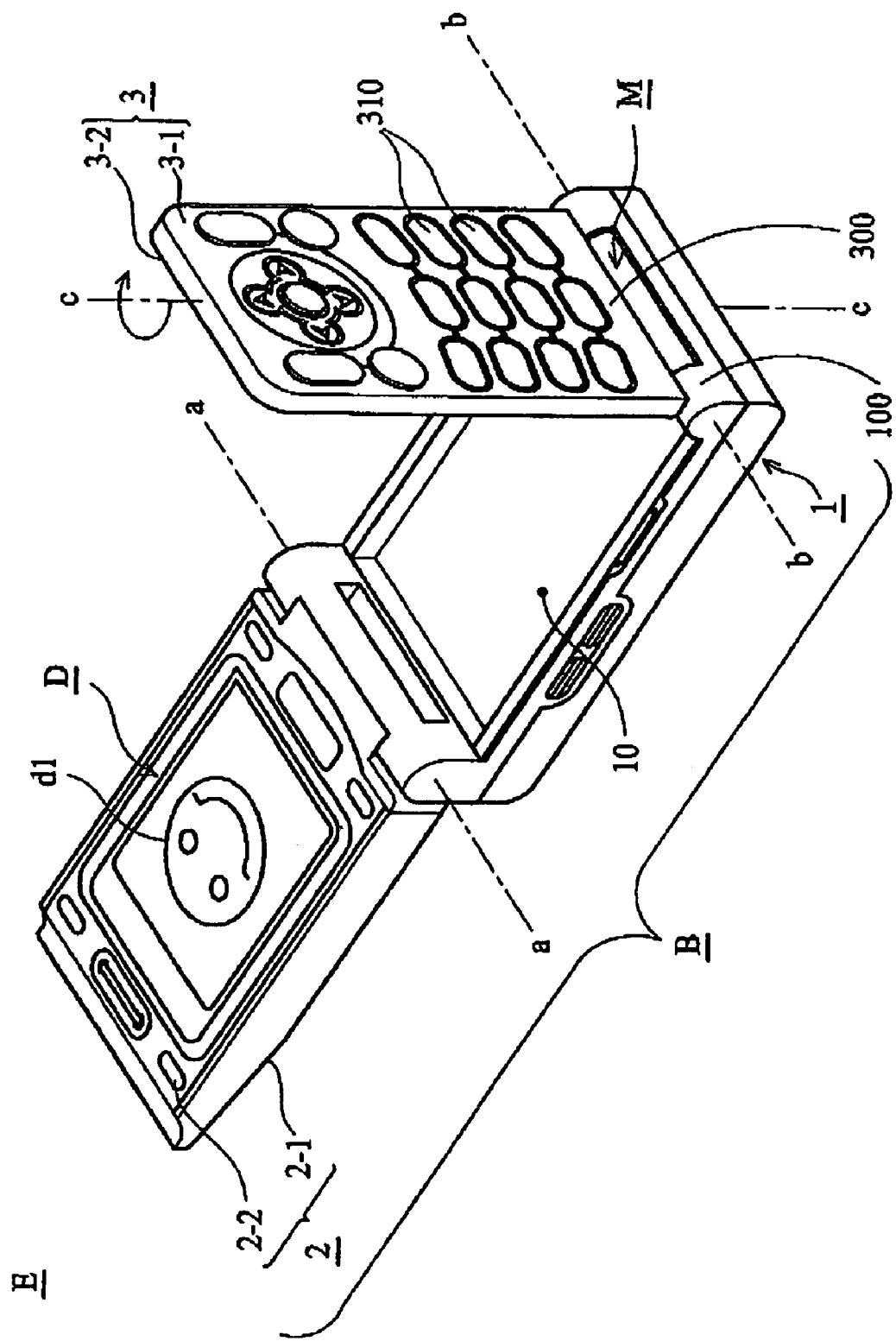
FIG. 3B is another perspective view of the electronic device (E) in FIG. 3A, wherein the index unit (3) is rotated about an axis (b-b) to a standing position.
Figure 3C:
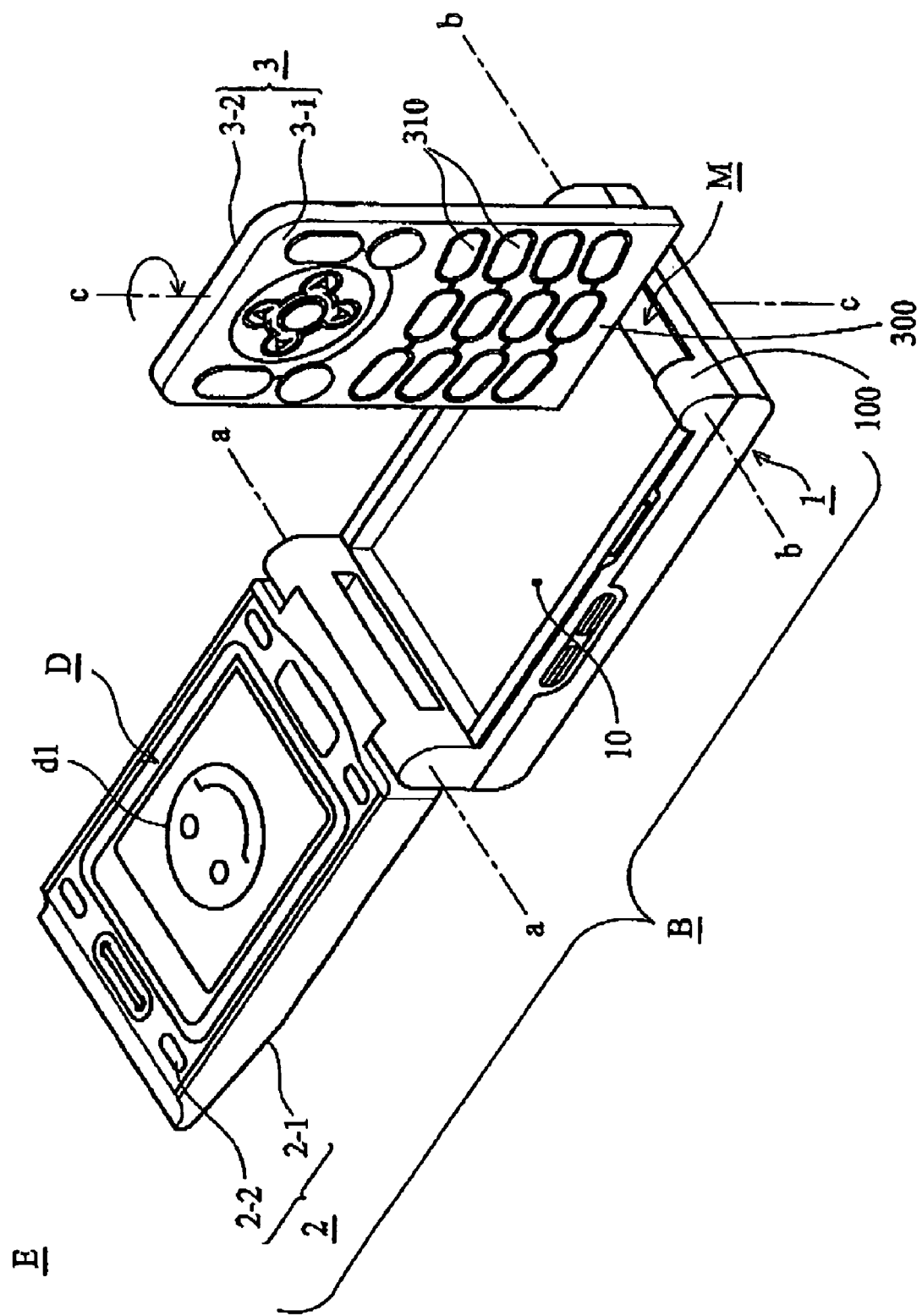
FIG. 3C is another perspective view of the electronic device (E) in FIG. 3B, wherein the index unit (3) is rotated about an axis (c-c) to another standing position.
Figure 3D:
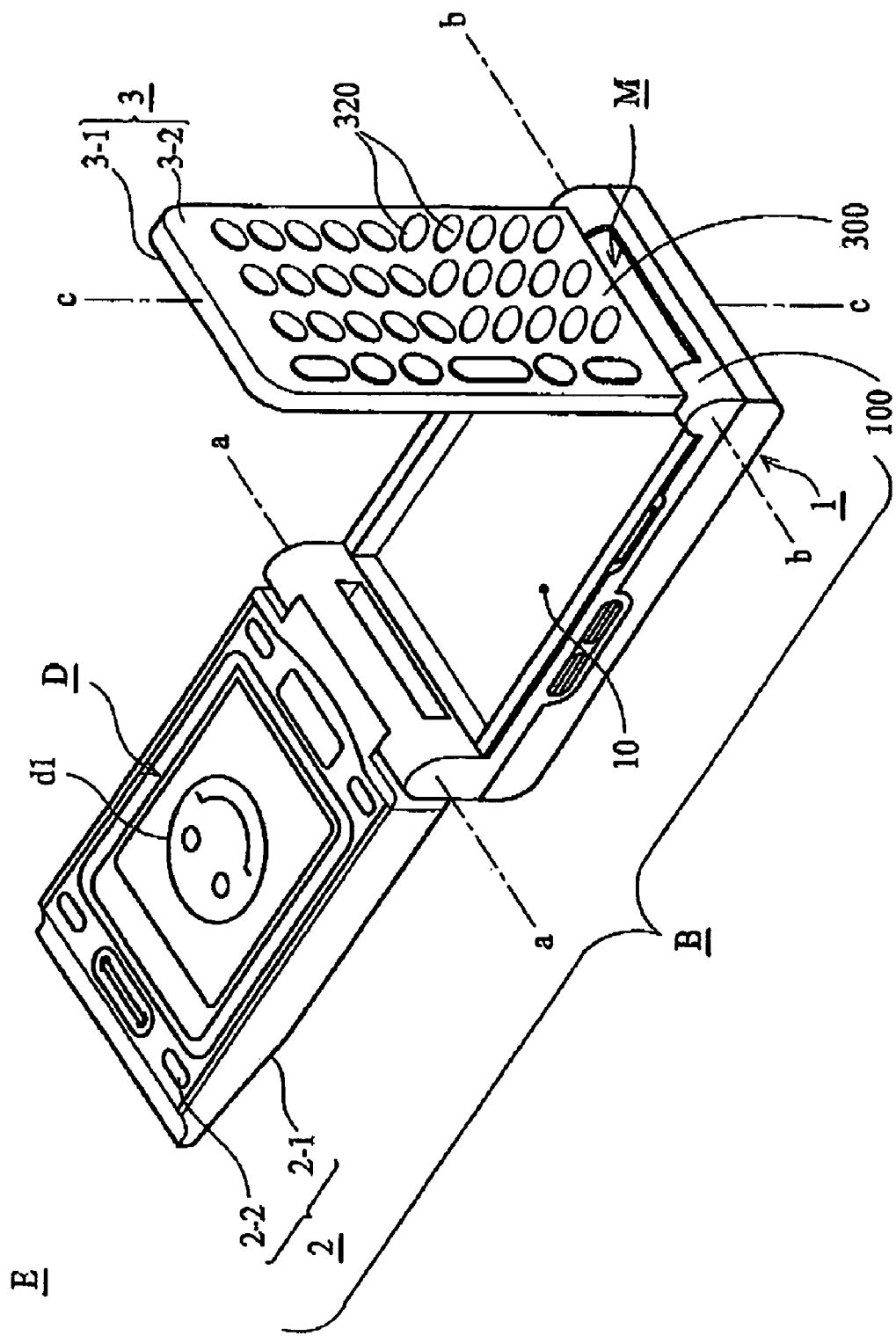
FIG. 3D is another perspective view of the electronic device (E) in FIG. 3C, wherein the index unit (3) is rotated about the axis (c-c) to yet another standing position.
Figure 3E:
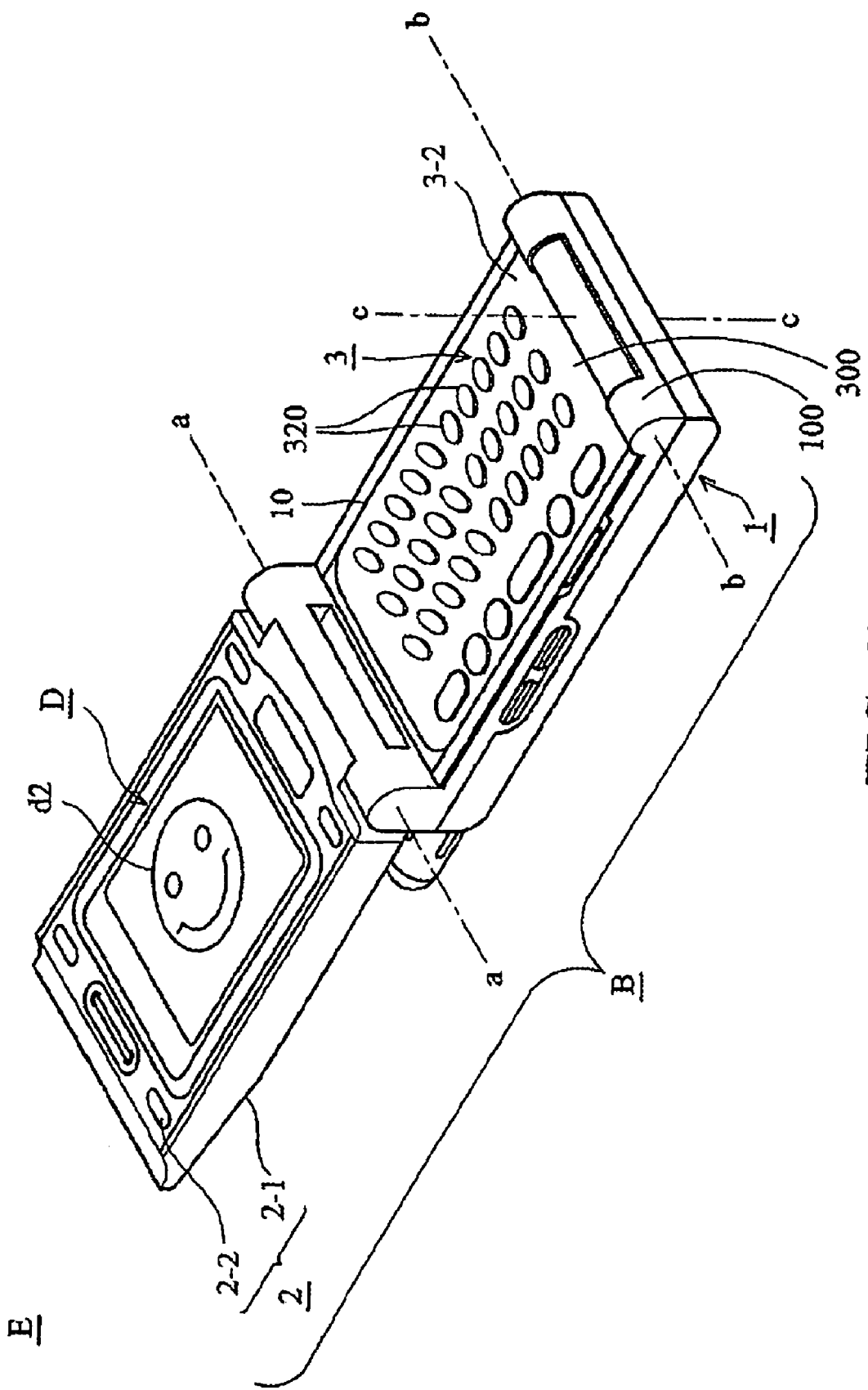
FIG. 3E is another perspective view of the electronic device (E) in FIG. 3D, wherein the index unit (3) is rotated about the axis (b-b) and in a second mode.

FIGS. 3A to 3E show five perspective views of the index unit 3 rotated from a first mode (FIG. 3A) to a second mode (FIG. 3E).

In FIG. 3A, a force F is applied to the index unit 3 received in the main seat 10 to rotate the index unit 3 about a second axis b-b. The index unit 3 in FIG. 3B is located in a standing position, and the index unit 3 in FIG. 3C is rotated about a third axis c-c to another standing position, and the index unit 3 in FIG. 3D is still rotated about the third axis c-c to another standing position. Finally, by rotating the index unit 3 about the axis b-b, the index unit 3 in FIG. 3E is received in the main seat 10 of the first element 1 and in the fall second mode.

In FIGS. 3A and 3B, the first element 1 and the second element 2 rotate about the first axis a-a into an open position at 180°. Thus, the degree of freedom of the first element 1 with respect to the second element 2 or of the second element 2 with respect to the first element 1 is one.

The main seat 10 is a recess formed on the first element 1 for receiving the index unit 3 in different operating modes.

The connecting end 300 of the index unit 3 is limited by the pivotal seat 100 of the body B when the index unit 3 is moved between the first mode (FIG. 3A) and the second mode (FIG. 3B).

In FIG. 3C, the intermediate element M is a hinge disposed between the index unit 3 and the second element 2, i.e., the axis of the intermediate element M overlaps with the second axis b-b and is coupled to the first element 1. The index unit 3 is connected to the middle portion of the intermediate element M and can spin along the third axis c-c.

In this embodiment, the third axis c-c is substantially not parallel to the second axis b-b, and the third axis c-c is substantially perpendicular to the second axis b-b. When the index unit 3 is rotated about the second axis b-b with respect to the first element 1, the intermediate element M is also simultaneously rotated about the second axis b-b with the index unit 3. Further, the index unit 3 can still rotate about the third axis c-c, such that the degree of freedom of the index unit 3 with respect to the first element 1 is two.

FIGS. 3D and 3E, the index unit 3 further provides a second index port 3-2 opposite to the first index port 3-1. The second index port 3-2 is electronically connected to the display unit D through a circuit (not shown) and exposed on the outside of the first element 1 in FIG. 3E, such that the display unit D can be controlled by the second index port 3-2. The second index port 3-2 is composed of several keys 320 with functions different from those of the first index port 3-1. The connecting end 300 of the index unit 3 is limited by the pivotal seat 100 of the body B when the index unit 3 is moved between the first mode (FIG. 3A) and the second mode (FIG. 3E).

In this preferred embodiment, the electronic device E is a mobile phone, but the design of the index unit 3 can also be applied to products such as Personal Digital Assistant (PDA), portable computer, calculator, etc.

It is noted that an icon d1 on the display unit D in FIG. 3A is in accordance with the arrangement of the keys 310 of the first index port 3-1 of the index unit 3, i.e., this mode of the electronic device E in FIG. 3A is normal for a mobile phone. An icon d2 shown on the display unit D in FIG. 3E is in accordance with the arrangement of the keys 320 of the second index port 3-2 of the index unit 3, i.e., this mode of the electronic device E in FIG. 3E is in PDA mode. That is to say, when the first index port 3-1 is changed to the second index port 3-2 or the second index port 3-2 to the first index port 3-1, the orientation of the image on the display unit D changes depending on the first index port 3-1 or the second index port 3-2.

Thus, the electronic device E can perform mobile phone or PDA functions by switching of the first index port 3-1 of the index unit 3 to the second index port 3-2 of the index unit 3.

While this invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. An electronic device, comprising:
   a body comprising a main seat and a pivotal seat;
   a display unit disposed on the body; and
   an index unit received in the main seat of the body, having
      a connecting end coupled to the pivotal seat of the body,
      a first index port and a second index port, moving between a first mode to expose the first index port and a second mode to expose the second index port, wherein the connecting end of the index unit is limited by the pivotal seat of the body when the index unit is moved between the first mode and the second mode, and the index unit received in the main seat of the body is enclosed by the body.

2. The electronic device as claimed in claim 1, wherein the index unit is electronically connected to the display unit.

3. The electronic device as claimed in claim 1, wherein the first index port or the second index port is electronically connected to the display unit.

4. The electronic device as claimed in claim 1, wherein the body comprises a first panel and a second panel, and the display unit is disposed on the first panel and the second panel.

5. The electronic device as claimed in claim 1, wherein the display unit is a liquid crystal display.

6. The electronic device as claimed in claim 1, wherein the connecting end of the index unit does not slide with respect to the body when the index unit is moved between the first mode and the second mode.

7. The electronic device as claimed in claim 1, wherein the main seat is a recess.

8. An electronic device, comprising:
   a first element comprising a main seat and a pivotal seat;
   a second element coupled to the first element with at least one degree of freedom; and
   an index unit received in the main seat of the first element, comprising a connecting end coupled to the pivotal seat of the first element with at least two degree of freedom, wherein the connecting end of the index unit is limited by the pivotal seat of the first element when the index unit is moved with respect to the first element, and the index unit received in the main seat of the first element is enclosed by the first element and the second element.

9. The electronic device as claimed in claim 8 further comprising a display unit disposed on the second element.

10. The electronic device as claimed in claim 9, wherein the index unit further comprises a first index port and a second index port, and the first index port or the second index port is electronically connected to the display unit.

11. The electronic device as claimed in claim 9, wherein the display unit is a liquid crystal display.

12. The electronic device as claimed in claim 8, wherein the second element comprises a first panel and a second panel, on which the display unit is disposed.

13. The electronic device as claimed in claim 8, wherein the connecting end of the index unit does not slide with respect to the first element when the index unit is moved with the at least two degree of freedom.

14. The electronic device as claimed in claim 8, wherein the main seat is a recess.

15. An electronic device, comprising:
   a first element comprising a main seat;
   a second element coupled to the first element along a first axis;
   a display unit disposed on the second element;
   an intermediate element limitedly disposed on the main seat of the first element and rotated along a second axis, wherein the second axis is not the same as the first axis; and
   an index unit disposed on and coupled to the intermediate element along a third axis.

16. The electronic device as claimed in claim 15, wherein the third axis is substantially perpendicular to the second axis.

17. The electronic device as claimed in claim 15, wherein the index unit further comprises a first index port and a second index port, and the first index port or the second index port is electronically connected to the display unit.

18. The electronic device as claimed in claim 15, wherein the second element comprises a first panel and a second panel on which the display unit is disposed.

19. The electronic device as claimed in claim 15, wherein the display unit is a liquid crystal display.

20. The electronic device as claimed in claim 15, wherein the main seat is a recess formed on the first element to receive the index unit, and the index unit received in the recess of the first element is enclosed by the first element and the second element.

21. An electronic device, comprising
   a first element comprising a main seat and a pivotal seat;
   a second element coupled to the first element along a first axis;
   a display unit disposed on the second element;
   an intermediate element limitedly disposed on the pivotal seat of the first element and rotated along a second axis, wherein the second axis is not the same as the first axis; and
   an index unit accessibly received in the main seat of the first element, coupled to the intermediate element along a third axis different from the second axis.

22. The electronic device as claimed in claim 21, wherein the third axis is substantially perpendicular to the second axis.

23. The electronic device as claimed in claim 21, wherein the main seat is a recess formed on the first element to receive the index unit.

24. The electronic device as claimed in claim 21, wherein the main seat is a recess formed on the first element to receive the index unit and the index unit received in the recess of the first element is enclosed by the first element and the second element.

25. The electronic device as claimed in claim 21, wherein the second element comprises a first panel and a second panel, on which the display unit is disposed.

26. The electronic device as claimed in claim 21, wherein the display unit is a liquid crystal display.

* * * * *